United States Patent
Fan

(10) Patent No.: US 11,619,977 B2
(45) Date of Patent: Apr. 4, 2023

(54) BUTTON ASSEMBLY, ELECTRONIC DEVICE, AND WEARABLE DEVICE

(71) Applicant: GUANGDONG OPPO MOBILE TELECOMMUNICATIONS CORP., LTD., Guangdong (CN)

(72) Inventor: Wei Fan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 98 days.

(21) Appl. No.: 17/198,726

(22) Filed: Mar. 11, 2021

(65) Prior Publication Data
US 2021/0294387 A1    Sep. 23, 2021

(30) Foreign Application Priority Data

Mar. 19, 2020  (CN) .......................... 202010198816.5
Mar. 19, 2020  (CN) .......................... 202020357527.0

(51) Int. Cl.
*G06F 1/16*    (2006.01)
*H01H 13/14*    (2006.01)
*H01H 13/26*    (2006.01)

(52) U.S. Cl.
CPC ............ *G06F 1/1671* (2013.01); *G06F 1/163* (2013.01); *H01H 13/14* (2013.01); *H01H 13/26* (2013.01)

(58) Field of Classification Search
CPC .. H01H 3/02; H01H 3/00; H01H 3/12; H01H 9/00; H01H 9/02; H01H 9/04;

(Continued)

(56) References Cited

U.S. PATENT DOCUMENTS 4,149,662 A * 4/1979 Ramaciere ............... A44C 5/14
                                                    224/164
6,963,039 B1   11/2005 Weng et al.
(Continued)

FOREIGN PATENT DOCUMENTS

CN        201425901 Y    3/2010
CN        102056430 A    5/2011
(Continued)

OTHER PUBLICATIONS

International Search Report for International Application PCT/CN2021/080538 dated Jun. 18, 2021. (9 pages).

(Continued)

*Primary Examiner* — Anthony R Jimenez
(74) *Attorney, Agent, or Firm* — Young Basile Hanlon & MacFarlane, P.C.

(57) ABSTRACT

Provided are an electronic device, including a side frame, a signal triggering element fixedly disposed inside the side frame, and a button configured to extend through the side frame. The side frame defines a button hole directly facing the signal triggering element, and a limiting protrusion is arranged on an inner wall of the button hole. The button includes: a button post, extending through the side frame and disposed adjacent to the signal triggering element; a button cap, connected to the button post and engaged with the button hole; and a snap board, fastened to a side of the button cap facing the signal triggering element, wherein the snap board is configured with a hook engaged with the limiting protrusion for limiting.

18 Claims, 14 Drawing Sheets

(58) Field of Classification Search
CPC ........ H01H 9/041; H01H 13/00; H01H 13/04; H01H 13/26; H01H 13/50; H01H 2003/02; H01H 2003/12; H01H 2223/00; H01H 2223/002; H01H 2223/01; H01H 2223/03; H01H 2223/04; H01H 2223/044; H01H 2231/00; H01H 2231/002; H01H 2231/016; H01H 2231/022; H01H 2239/034; H01H 2227/036; H01H 2215/012; H01H 13/70; H01H 2221/026; H01H 13/14; G06F 1/16; G06F 1/163; G06F 1/1633; G06F 1/1671; G06F 1/169; G06F 1/181
USPC ................ 378/286, 287, 289, 290, 291, 316
See application file for complete search history.

(56) References Cited

U.S. PATENT DOCUMENTS

| | | | |
|---|---|---|---|
| 10,102,985 | B1 * | 10/2018 | Pelletier ................ H01H 13/06 |
| 2012/0050962 | A1 | 3/2012 | Hsiung |
| 2013/0050909 | A1 | 2/2013 | Stanley |
| 2014/0233360 | A1 * | 8/2014 | Koshoji ................ H01H 13/06 200/341 |
| 2015/0007501 | A1 | 1/2015 | Liang |
| 2019/0371544 | A1 | 12/2019 | Gu et al. |

FOREIGN PATENT DOCUMENTS

| | | |
|---|---|---|
| CN | 204289177 U | 4/2015 |
| CN | 205845781 U | 12/2016 |
| CN | 207474347 U | 6/2018 |
| CN | 106304732 B | 3/2019 |
| CN | 110138946 A | 8/2019 |
| CN | 211828564 U | 10/2020 |
| EP | 2933813 A1 | 10/2015 |
| JP | 2001184976 A | 7/2001 |

OTHER PUBLICATIONS

Extended European Search Report for EP Application 21163206.2 dated Aug. 25, 2021. (10 pages).

* cited by examiner

BUTTON ASSEMBLY, ELECTRONIC DEVICE, AND WEARABLE DEVICE

CROSS-REFERENCE TO RELATED APPLICATION(S)

The present application claims priorities of Chinese Patent Application No. 202010198816.5, filed on Mar. 19, 2020, and Chinese Patent Application No. 202020357527.0, filed on Mar. 19, 2020, the entire contents of both of which are hereby incorporated by reference.

TECHNICAL FIELD

The present disclosure relates to the field of communication devices, and in particular to a button assembly, an electronic device, and a wearable device.

BACKGROUND

Currently, buttons are provided in electronic devices, and the electronic devices may be controlled by using the buttons. In the art, the button is often provided with a snap ring at an end of a button post, and the snap ring abuts against a limiting structure. The snap ring is limited by the limiting structure to prevent the button from falling off a frame of the electronic device and ensure security of the button. Due to a limited mounting space at the end of the button post, structural performance of the end of the snap ring and the button post may be reduced, and assembling may be difficult.

SUMMARY

In a first aspect, the present disclosure provides a button assembly including a side frame, a signal triggering element fixedly disposed inside the side frame, and a button configured to extend through the side frame. The side frame defines a button hole. A limiting protrusion is arranged on an inner wall of the button hole. The button includes: a button post, received in the button hole to further extend through the side frame and disposed adjacent to the signal triggering element; a button cap, connected to the button post and at least partially received in the button hole; and a snap board, fastened to a side of the button cap facing the signal triggering element. The snap board is configured with a hook engaged with the limiting protrusion for limiting.

In a second aspect, the present disclosure provides an electronic device, including: a front cover and a back cover, disposed spaced apart from each other and opposite to each other; a side frame; and a pressing assembly. The side frame is connected between the front cover and the back cover to define a receiving space. The side frame further defines a through hole communicating to the receiving space and an external environment of the electronic device. The pressing assembly is engaged with the side frame and at least partially received in the receiving space. The pressing assembly includes: a signal triggering element, a limiting member, a button post, a button cap, and a snap board. The signal triggering element is fixedly received in the receiving space. The limiting member is disposed on an inner wall of the through hole and protruding towards the through hole. The button post is received in the through hole. An end of the button post is disposed adjacent to but spaced apart from the signal triggering element in a first state, and the end of the button post is in contact with the signal triggering element in a second state. The button cap is at least partially received in the through hole and connected to the other end of the button post. The snap board is fastened to a side of the button cap facing the signal triggering element and configured with a hook engaged with the limiting member in the first state.

In a third aspect, the present disclosure provides a wearable device including: a front cover and a back cover, disposed spaced apart from each other and opposite to each other; a side frame, a wearable component, and a pressing assembly. The side frame is connected between the front cover and the back cover to define a receiving space. The side frame further defines a through hole communicating to the receiving space and an external environment of the wearable device. The wearable component is detachably connected to the side frame. The pressing assembly is engaged with the side frame and at least partially received in the receiving space. The pressing assembly includes: a signal triggering element, a limiting member, a button post, a button cap, and a snap board. The signal triggering element is fixedly received in the receiving space. The limiting member is disposed on an inner wall of the through hole and protruding towards the through hole. The button post is received in the through hole. An end of the button post is disposed adjacent to but spaced apart from the signal triggering element in a first state, and the end of the button post is in contact with the signal triggering element in a second state. A button cap is at least partially received in the through hole and connected to the other end of the button post. A snap board is fastened to a side of the button cap facing the signal triggering element and configured with a hook engaged with the limiting member in the first state.

BRIEF DESCRIPTION OF DRAWINGS

In order to illustrate technical solutions of embodiments of the present disclosure clearly, accompanying drawings for describing the embodiments will be introduced in brief. Obviously, the drawings in the following description are only some embodiments of the present application. For those skilled in the art, other drawings can be acquired based on the provided drawings without any creative work.

DETAILED DESCRIPTION

Figure 1:
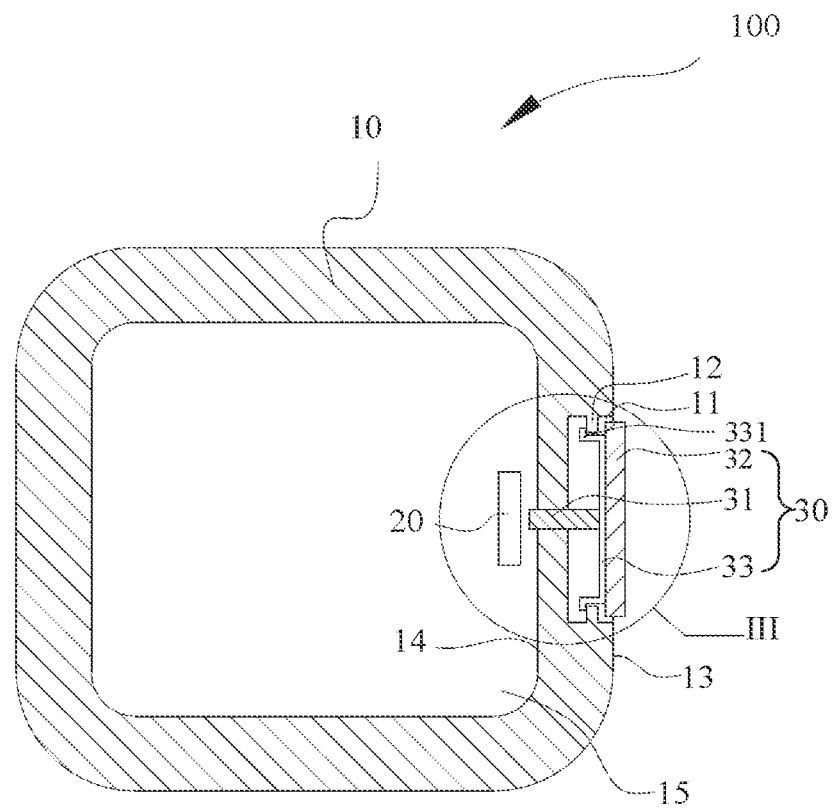
FIG. 1 is a cross-sectional view of an electronic device according to an embodiment of the present disclosure.

Technical solutions of the present disclosure will be described clearly and comprehensively by referring to accompanying drawings of embodiments of the present disclosure.

In a first aspect, the present disclosure provides a button assembly including a side frame, a signal triggering element fixedly disposed inside the side frame, and a button configured to extend through the side frame. The side frame defines a button hole. A limiting protrusion is arranged on an inner wall of the button hole. The button includes: a button post, received in the button hole to further extend through the side frame and disposed adjacent to the signal triggering element; a button cap, connected to the button post and at least partially received in the button hole; and a snap board, fastened to a side of the button cap facing the signal triggering element. The snap board is configured with a hook engaged with the limiting protrusion for limiting.

In some embodiments, two limiting protrusions are disposed on two opposite inner walls of the button hole along a length direction of the button hole; and two ends of the snap board corresponding to two ends of the button cap along a length direction of the button cap are configured with two hooks respectively.

In some embodiments, the button cap defines two rivet holes at the two ends of the button cap along the length direction of the button cap. Each of the two rivet holes is defined by a side of the button cap facing the button post being recessed inwardly. The button further includes two rivets, extending through the snap board and received into the two rivet holes respectively, outer walls of the two rivets are engaged with inner walls of the two rivet holes with an interference fit.

In some embodiments, the button cap defines a fastening groove, the fastening groove is defined by the side of the button cap facing the button post be recessed inwardly. A portion of an outer face of the snap board facing the button cap is protruded to be a protrusion, the protrusion is fixedly received in the fastening groove. An inner face of the snap board facing the button post is recessed inwardly at a position corresponding to the protrusion to define a recess corresponding to the protrusion. An end of the button post is connected to the snap board and the button cap through the recess.

In some embodiments, the button further includes an elastic gasket fixedly connected to the button post and the snap board, and at least a portion of the elastic gasket is fixedly received in the recess.

In some embodiments, the button further includes two elastic elements, the two elastic elements are configured to sleeve on two ends of the two rivets respectively, and the two elastic elements are elastically compressed between the button cap and the side frame.

In some embodiments, a side of the side frame close to the signal triggering element defines a button guide hole communicating with the button hole. The button post is received in and extends through the button guide hole. An outer wall of the button post is engaged with an inner circumferential wall of the button guide hole with a clearance fit.

In some embodiments, an end of the button post away from the button cap is configured with a seal ring along a circumferential direction of the button post, and an outer circumferential wall of the seal ring is engaged with the inner circumferential wall of the button guide hole with an interference fit.

In some embodiments, the side of the button cap facing the signal triggering element is configured with a guide post. The guide post extends through the snap board, and a position of the snap board through which the guide post extends is at a side of the hook close to the button post. The side frame defines a guide hole, the guide post is partially received in the guide hole, and an outer wall of the guide post is engaged with an inner wall of the guide post with a clearance fit.

In some embodiments, the button cap is configured with a plurality of pressing portions along the length direction of the button cap. The button includes a plurality of button posts, facing the plurality of pressing portions respectively and connected to the button cap. The electronic device comprises a plurality of signal triggering elements, disposed adjacent to a plurality of end portions of the plurality of button posts respectively.

In some embodiments, the button comprises two snap boards, fastened to two ends of the button cap along a length direction of the button cap. The button post is connected to a portion of the button cap between the two ends fastened to the two snap boards.

In some embodiments, the button includes a pressing plate received in the button hole. A side of the pressing plate facing the button cap is configured with a buckle engaged with the button cap. The pressing plate is buckled with the button cap through the buckle. The snap board is fastened between the pressing plate and the button cap. The hook protrudes from the pressing plate. The button post extends through the pressing plate to connect to the button cap.

In some embodiments, the snap board is configured with an elastic buckle. A side of the button cap facing the signal triggering element defines a buckling hole. The elastic buckle is fixedly buckled into the buckling hole.

In a second aspect, the present disclosure provides an electronic device, including: a front cover and a back cover, disposed spaced apart from each other and opposite to each other; a side frame; and a pressing assembly. The side frame is connected between the front cover and the back cover to define a receiving space. The side frame further defines a through hole communicating to the receiving space and an external environment of the electronic device. The pressing assembly is engaged with the side frame and at least partially received in the receiving space. The pressing assembly includes: a signal triggering element, a limiting member, a button post, a button cap, and a snap board. The signal triggering element is fixedly received in the receiving space. The limiting member is disposed on an inner wall of the through hole and protruding towards the through hole. The button post is received in the through hole. An end of the button post is disposed adjacent to but spaced apart from the signal triggering element in a first state, and the end of the button post is in contact with the signal triggering element in a second state. The button cap is at least partially received in the through hole and connected to the other end of the button post. The snap board is fastened to a side of the button cap facing the signal triggering element and configured with a hook engaged with the limiting member in the first state.

In some embodiments, two ends of the snap board are configured with two hooks. A distance exists between each of the two hooks and the side of the button cap facing the signal triggering element. Two limiting members are opposite to each other and disposed on the inner wall of the through hole, and each of the two limiting members is disposed between each of the two hooks and the side of the button cap facing the signal triggering element along the distance. The two hooks are slidable in the through hole. The two hooks are engaged with the two limiting members in the first state, and separated from the two limiting members in the second state.

In some embodiments, the button cap defines two rivet holes at the two ends of the button cap along a length direction of the button cap. The two rivet holes are defined by the side of the button cap facing the signal triggering element being recessed inwardly. The pressing assembly further comprises two rivets extending through the snap board and received into the two rivet holes respectively. Outer walls of the two rivets are engaged with inner walls of the two rivet holes with an interference fit.

In some embodiments, the side of the button cap facing the signal triggering element is recessed inwardly to define a fastening groove. A portion of an outer face of the snap board facing the button cap is protruded to be a protrusion, the protrusion is fixedly received in the fastening groove. An inner face of the snap board facing the button post is recessed inwardly at a position corresponding to the protrusion to define a recess corresponding to the protrusion. The other end of the button post is connected to the snap board and the button cap through the recess.

In some embodiments, the pressing assembly further comprises an elastic gasket fixedly connected to the button post and the snap board, and at least a portion of the elastic gasket is fixedly received in the recess.

In some embodiments, a main board, received in the receiving space, wherein the signal triggering element is fixedly disposed on the main board. A display screen, attached to the front cover and disposed between the front cover and the side frame.

In a third aspect, the present disclosure provides a wearable device including: a front cover and a back cover, disposed spaced apart from each other and opposite to each other; a side frame, a wearable component, and a pressing assembly. The side frame is connected between the front cover and the back cover to define a receiving space. The side frame further defines a through hole communicating to the receiving space and an external environment of the wearable device. The wearable component is detachably connected to the side frame. The pressing assembly is engaged with the side frame and at least partially received in the receiving space. The pressing assembly includes: a signal triggering element, a limiting member, a button post, a button cap, and a snap board. The signal triggering element is fixedly received in the receiving space. The limiting member is disposed on an inner wall of the through hole and protruding towards the through hole. The button post is received in the through hole. An end of the button post is disposed adjacent to but spaced apart from the signal triggering element in a first state, and the end of the button post is in contact with the signal triggering element in a second state. A button cap is at least partially received in the through hole and connected to the other end of the button post. A snap board is fastened to a side of the button cap facing the signal triggering element and configured with a hook engaged with the limiting member in the first state.

Figure 2:
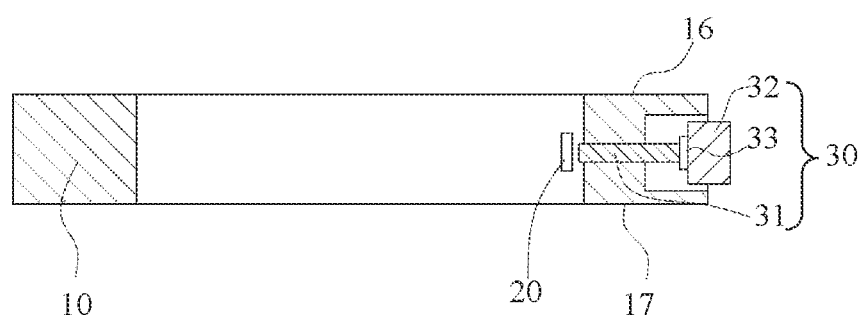
FIG. 2 is a cross-sectional view of a portion of an electronic device according to an embodiment of the present disclosure.
Figure 3:
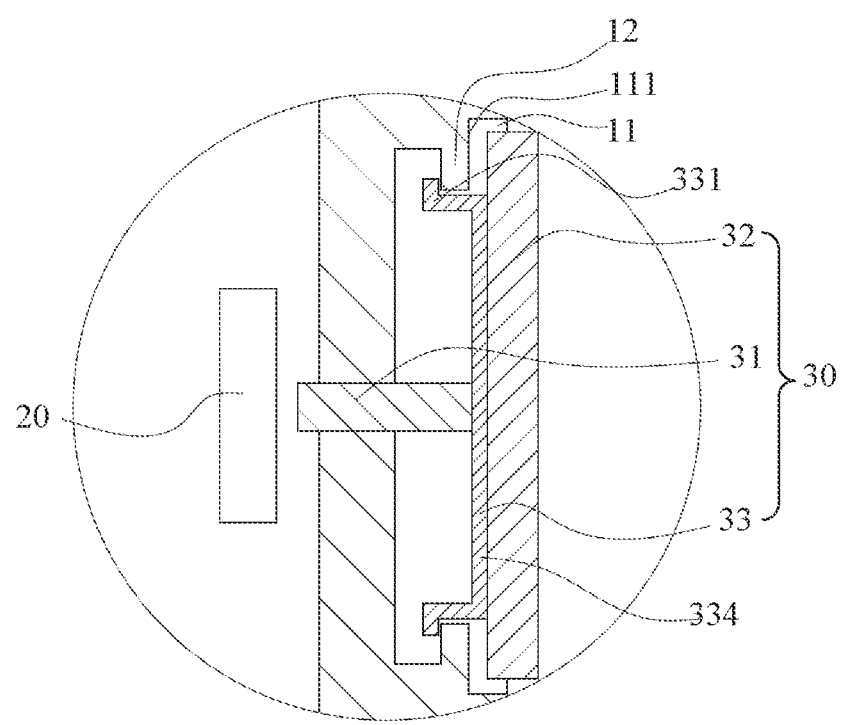
FIG. 3 is an enlarged view of a portion III of the electronic device shown in FIG. 2.

As shown in FIG. 1, FIG. 2, and FIG. 3, an electronic device 100 is provided according to the present disclosure. The electronic device 100 may include a side frame 10, a signal triggering element 20, and a button 30. The signal triggering element 20 may be fixed to an inner side of the side frame 10. The button 30 may pass through the side frame 10. The side fame 10 may define a button hole 11 facing the signal triggering element 20. A limiting protrusion 12 is arranged on an inner wall of the button hole 11. The button 30 may include a button post 31, a button cap 32, and a snap board 33. The button post 31 may extend through the side frame 10 and may be disposed adjacent to the signal triggering element 20. The button cap 32 may be connected to the button post 31 and may at least be partially received in the button hole 11. The snap board 33 may be fastened to a side of the button cap 32 facing towards the signal triggering element 20. The snap board 33 may be configured with a hook 331 to engage with the limiting protrusion 12 for limiting.

It should be understood that, the electronic device 100 may be a terminal device, such as a smart phone, a tablet computer, a notebook computer, and so on, or a smart wearable device, such as a smart watch, a smart earphone, smart glasses, and so on. The button cap 32 may be pressed and transfer a pressing torque to the button post 31 to enable the button post 31 to trigger the signal triggering element 20 to transmit a signal, such that the electronic device 100 may be controlled. The hook 331 may hook the limiting protrusion 12 to prevent the button cap 32 from separating from the side frame 10 through the button hole 11.

By arranging the limiting protrusion 12 at the inner wall of the button hole 11, the button 30 may include the snap board 33 to be fastened to the side of the button cap 32 facing the signal triggering element 20. The snap board 33 may be configured with the hook 331 to engage with the limiting protrusion 12 for limiting. The hook 331 of the snap board 33 may securely limit the button cap 32 and prevent the button cap 32 from falling off. Further, the hook 331 ensures stability of the snap board 33 and the button cap 32, such that structural stability of the button 30 may be improved, and difficulties of assembling the button may be reduced.

According to the embodiments of the present disclosure, the snap board 33 and the button cap 32 may be fastened to improve stability of the snap board 33 and the button cap 32, and the snap board 33 and the button cap 32 may be assembled easily. The hook 331 of the snap board 33 may be engaged with the limiting protrusion 12 to prevent the snap board 33 and the button cap 32 falling off through the button hole 11, ensuring the security of the button 30.

In the present embodiment, the side frame 10 may serve as a framework structural element of the electronic device 100 to provide support for various elements of the electronic device 100, such that an entire structure of the electronic device 100 may be stable. The side frame 10 may take a rigid stress to provide protection for the electronic device 100, such that protective performance of the electronic device 100, such as dropping protection of the electronic device, shattering protection of the electronic device, and cracking protection of the electronic device, may be achieved.

In detail, the side frame 10 may include an outer side face 13 and an inner side face 14 opposite to the outer side face 13. The inner side face 14 may include an even face and an uneven face. That is, the inner side face 14 may have a flat face, the flat face may define a plurality of recesses, and a plurality of protrusions may protrude from the flat face, such that an inner side of the side frame 10 may be adapted to and stabilize various elements. The inner side face 14 may be an interface of an inner space roughly enclosed by the side frame 10. The outer side face 13 may include an even face and an uneven face. That is, the outer side face 13 may have a flat face, the flat face may define a plurality of recesses, and a plurality of protrusions may protrude from the flat face. The outer side face 13 may be an exterior face forming the side frame 10. The inner side face 14 are enclosed to define a receiving space 15. Various elements, which may be a main board, the signal triggering element 20, a camera, a sensor, a non-transitory memory, an antenna, and so on, may be received in the receiving space 15.

The side frame 10 may further include a first end face 16 and a second end face 17 opposite to the first end face 16. The inner side face 14 and the outer side face 13 may be connected to the first end face 16 and the second end face 17. The first end face 16 and the second end face 17 may be engaged with front structural components of the electronic device 100 and rear structural components of the electronic device 100, respectively. The front structural components may refer to components facing a user forwardly while the electronic device 100 is in use, and the rear structural components may refer to components facing the user oppositely while the electronic device 100 is in use. For example, a display screen may be one of the front structural components, and a rear cover may be one of the rear structural components. Each of the first end face 16 and the second end face 17 may include an even face and an uneven face. That is, each of the first end face 16 and the second end face 17 may have a flat face, the flat face may define a plurality of recesses, and a plurality of protrusions may protrude from the flat face.

In the present embodiment, the signal triggering element 20 may be fixedly received in the receiving space 15 defined by the side frame 10. The signal triggering element 20 may be electrically connected to an element disposed inside the electronic device 100 to receive a trigger from the button 30. The signal triggering element 20 may transmit a triggering signal to other functional elements to enable the other functional elements to respond, such that the functional elements of the electronic device 100 may be controlled. The signal triggering element 20 may be fixedly received in the receiving space and disposed at a position adjacent to the inner side face 14. The signal triggering element 20 may be configured with a switching circuit, and the button post 31 may abut against the signal triggering element 20 to enable the switching circuit to be conducted or disconnected, such that an electrical signal may be triggered.

Alternatively, the signal triggering element 20 may abut against the button post 31 to improve sensitivity of the signal triggering element 20 receiving abutting of the button post 31.

Alternatively, there may be a certain distance between the signal triggering element 20 and the button post 31, such that a security distance may be maintained between the button post 31 and the signal triggering element 20 to reduce an impact force applied by the button post 31 on the signal triggering element 20.

In the present embodiment, the button cap 32 may be stacked on the button post 31, and an entirety of the button cap 32 and the button post 31 may extend through the side frame 10. The button cap 32 may be disposed adjacent to the outer side face 13 of the side frame 10. The button post 31 may be disposed adjacent to the inner side face 14 of the side frame 10. At least a portion of the button post 31 may be disposed between the outer side face 13 and the inner side face 14, such that the side frame 10 may carry the button post 31 and guide a direction of the button post 31 being pressed. The snap board 33 may be disposed between the outer side face 13 and the inner side face 14 to enable the snap board 33 to be engaged with the limiting protrusion 12. The button hole 11 may extend along a direction from the outer side face 13 to the inner side face 14. A bottom wall of the button hole 11 may further define a button post hole. The button post hole may communicate with the button hole 11 and the receiving space 15. A portion of the button post 31 may be received in the button post hole, and a diameter of the button post hole may be adapted to a diameter of the button post. Compared to the button cap 32, the snap board 33 may be disposed closer to the bottom wall of the button hole 11.

In detail, the button hole 11 may extend from the outer side face 13 towards the inner side face 14. An inner wall of the button hole 11 may be connected to the bottom wall and may be engaged with an outer circumferential wall of the button cap 32 with a clearance fit to guide a direction of the button cap 32 sliding and being pressed relative to the side frame 10. At least a portion of the button cap 32 may be received in the button hole 11, and another portion of the button cap 32 may be exposed out of the button hole 11. In response to the button cap 32 sliding relative to the side frame 10 by a pressing force, the button cap 32 may be completely received in the button hole 11.

While assembling the button 30, the button post 31 may firstly be arranged to and extend through the side frame 10, such that an end portion of the button post 31 may face the signal triggering element 20. Subsequently, the snap board 33 may be arranged and received in the button hole 11, and the hook 331 of the snap board 33 may hook the limiting protrusion 12. At last, the button cap 32 may be fastened with the snap board 33, such that the button cap 32 and the snap board 33 may be stabilized, and the button cap 32 may be connected to the button post 31.

In detail, a length direction of the button post 31 may substantially be perpendicular to the inner side face 14 and the outer side face 13 of the side frame 10, such that the button post 31 may slide relative to the side frame 10 along a direction perpendicular to the inner side face 14 and the outer side face 13 by receiving the pressing force applied from the button cap 32, and a sliding force applied by the button post 31 may be focused on the signal triggering element 20.

Two opposite inner walls of the button hole 11 may be configured with two limiting protrusions 12 respectively. The two limiting protrusion 12 may limit sliding of the button cap 32 by limiting two opposite ends of the button cap 32, such that the button cap 32 may be limited in a balanced manner, and may be prevented from lifting.

In more detail, the two opposite inner walls of the button hole 11 may be configured with two stages 111. The two limiting protrusions 12 may be configured at positions corresponding to the two stages 111. There may be a gap between the hook 331 and the button cap 32. The limiting protrusion 12 may be received in the gap. In response to the button cap 32 being pressed, the snap board and the button cap 32 may move for a certain distance relative to the limiting protrusion 12, and it may be regarded as the limiting protrusion 12 sliding in the gap.

The button cap 32 may be in a shape of a board. The button cap 32 may substantially be perpendicular to the length direction of the button post 31. An area of a face of the button cap 32 away from the button post 31 may be greater than an area of a face of the button post 31 facing the button cap 32. In this way, the button cap 32 may receive the pressing force easily and transfer the pressing force to the button post.

Alternatively, the button cap 32 may be a long strip board. A length direction of the button cap 32 may substantially be parallel to a length direction of the side frame 10. The button post 31 may be connected to a middle portion of the button cap 32, such that the button cap 32 may directly face the button post 31, the button cap 32 may transfer the pressing force to the button post 31 effectively, and a possibility of the button cap 32 being lifted due to the pressing force may be reduced.

Alternatively, the face of the button cap 32 away from the button post 31 may protrude from the outer side face 13, such that the user may sense a position of the button cap 32 quickly while touching the side frame 10, and it may be convenient for the user to press the button cap 32.

It should be understood that, in response to the hook 331 hooking the limiting protrusion 21, the button cap 32 may be positioned away from the bottom wall of the button hole 11 relative to the signal triggering element 20, such that the button cap 32 may not depart away from the side frame 10, and the button cap 32 may receive the pressing force. In response to the hook 331 being separated from the limiting protrusion 12, the button cap 32 may be moving towards the bottom wall of the button hole 11 under the pressing force. Two ends of the button cap 32 along the length direction of the button cap 32 may eventually abut against two stage faces of the two stages 111, respectively. That is, the limiting protrusion 12 may abut against the button cap 32 to limit the button cap 32 from further moving towards the signal triggering element 20, such that the button post 31 may be prevented from contacting the signal triggering element 20 excessively, and the security of the signal triggering element 20 may be ensured. The limiting protrusion 12 may slide between the hook 331 and the button cap 32 to ensure a secure sliding distance of the button cap 32. In other embodiments, the two limiting protrusions 12 may be disposed on two opposite even inner walls of the button hole 11, respectively.

The limiting protrusion 12 may be disposed on the inner wall of the button hole 11, such that the end portion of the button post 31 may not be required to be configured with the snap ring, ensuring an effectivity of the end portion of the button post 31, and enabling the button post 31 and the side frame 10 to be sealed with each other effectively. The snap board 33 may be efficiently and conveniently received in the button hole 11. The button cap 32 and the snap board 33 may be fixed and stabilized by fastening the button cap 32 to the snap board 33. Further, the button cap 32 may be engaged to the limiting protrusion 12 through the snap board 33, such that sliding of the button 30 may be limited securely and reliability of the button 30 may be improved. The button 30 may be assembled rapidly, reducing a cost for assembling and ensuring effectivity of the button 30.

Alternatively, the button cap 32 may be in a shape of a circular plate. A geometric central axis of the button cap 32 may coincide with a geometric central axis of the button post 31. Of course, the button cap 32 may further be in a shape of a board, such as a triangular board, a polygonal board, and so on.

Alternatively, the face of the button cap 32 away from the button post 31 may substantially align to the outer side face 13 to improve smoothness of an outer structure of the side frame 10.

Alternatively, the face of the button cap 32 away from the button post 31 may be recessed from the outer side face 13, such that security of the button 30 may be ensured in response to the button 30 being impacted while the electronic device 100 being dropped.

Alternatively, a face of an end of the button post 31 away from the button cap 32 may protrude from the inner side face 14, such that the button post 31 may abut against and connect to the signal trigger element 20.

Alternatively, the face of the end of the button post 31 away from the button cap 32 may align to the inner side face 14, such that smoothness of an inner structure of the side frame 10 may be improved, and utilization of the receiving space 15 may be improved.

Alternatively, the face of the end of the button post 31 away from the button cap 32 may be recessed from the inner side face 14, the end of the button post 31 may protrude from the side frame 10 to abut against the signal triggering element 20 by receiving the pressing force applied to the button cap 32.

Further, the two opposite inner walls of the button hole along the length direction may be configured with the two limiting protrusions 12, and two ends of the snap board 33 corresponding to the two ends of the button cap 32 along the length direction of the button cap may be configured with two hooks 331, respectively.

In the present embodiment, the two limiting protrusions 12 may be disposed on the two opposite inner walls of the button hole 11 along the length direction. The length direction of the snap board 33 may be parallel to the length direction of the button cap 32. A portion of the snap board 33 between the two hooks 331 may be fastened to the button cap 32. The portion of the snap board 33 between the two hooks 331 may abut against the side of the button cap 32 facing towards the signal triggering element 20, such that the snap board 33 may be secured to the button cap 32. While fastening the snap board 33 to the button cap 32, the snap board 33 may be received in the button hole 11 and disposed close to the bottom wall of the button hole 11. Subsequently, the button cap 32 may be pressed to the snap board 33. The bottom wall of the button hole 11 and the button cap 32 may clamp the snap board 33 cooperatively. At last, the snap board 33 may be fastened and secured to the button cap 32.

In the present embodiment, the snap board 33 may be a metal flexible board. The portion of the snap board 33 between the two hooks 331 may be a connection arm 334. The hook 331 may be bent relative to the connection arm 334, and the hook 331 and the connection arm 334 may be configured integrally as an overall structure. The snap board 33 may be formed by a punching process. The connection arm 334 may abut against the side of the button cap 32 facing the button post 31, such that the connection arm 334 may be secured to the button cap 32. The hook 331 may be elastically bent relative to the connection arm 334. While receiving the snap board 33 in the button hole 11, one of the two hooks 331 at one end of the snap board 33 may abut against the inner wall of the button hole 11 to hook one of the two limiting protrusions 12. Further, the other one of the two hooks 331 at the other end of the snap board 33 may be pressed, such that the connection arm 334 may be deformed and bent, and the other one of the two hooks 331 may be received in the button hole 11 to hook the other one of the two limiting protrusions 12. In this way, the snap board 33 may be received in the button hole 11 and disposed close to the bottom wall of the button hole 11, and the two hooks 331 may hook the two limiting protrusions 12 respectively.

Figure 4:
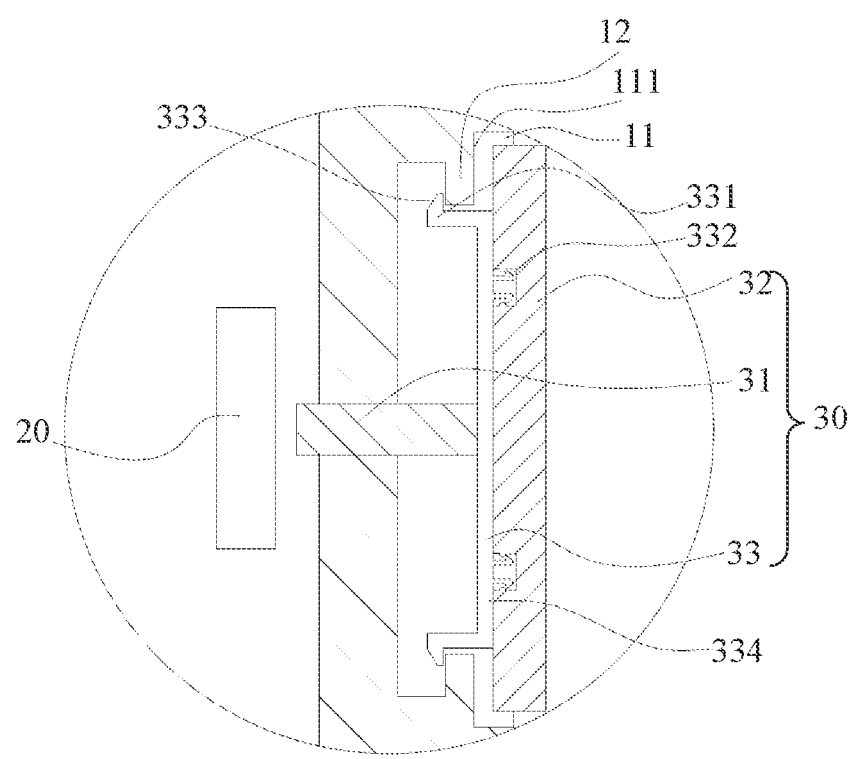
FIG. 4 is an enlarged view of a portion of an electronic device according to another embodiment of the present disclosure.

In another embodiment, as shown in FIG. 4, the snap board 33 may be a plastic board. The two hooks 331 of the snap board 33 and the portion between the two hooks 331 may be integrally formed. The snap board 33 may be configured with a buckle 332 between the two hooks 331. The snap board 33 may be fastened to the button cap 32 through the buckle 332. A side of an end portion of the hook 331 facing the bottom wall of the button hole 11 has an inclined surface 333, and the inclined surface 333 at the end portion of the hook 331 may be configured to guide the snap board 33 to slide relative to the limiting protrusion 12 to reduce a sliding and pressing resistance applied by the limiting protrusion 12 to the hook 331. By applying the pressing force to the snap board 33 towards the bottom wall of the button hole 11, the snap board 33 may slide towards the bottom wall of the button hole 11, and the two hooks 331 may eventually hook the two limiting protrusions 12.

Figure 5:
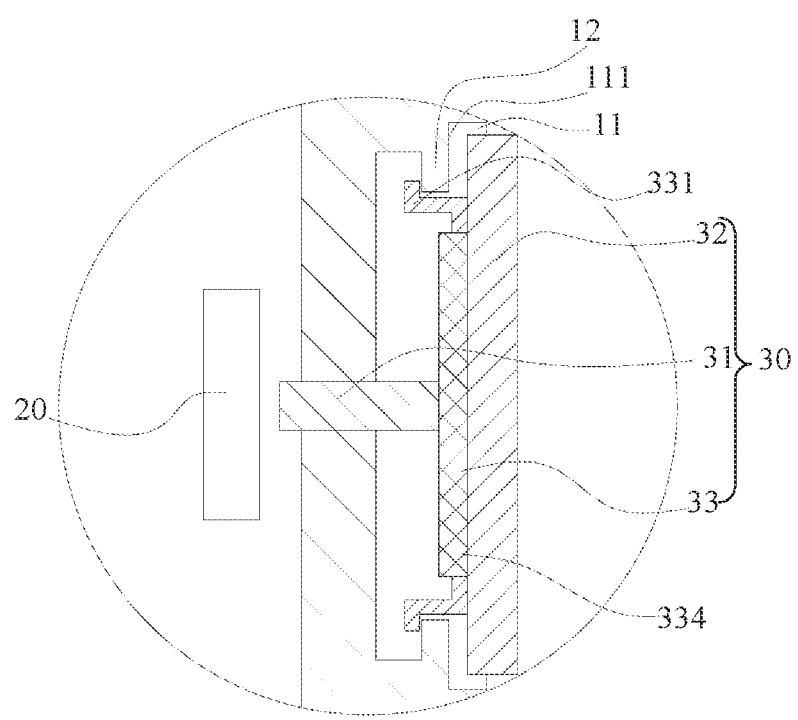
FIG. 5 is an enlarged view of a portion of an electronic device according to another embodiment of the present disclosure.

In another embodiment, as shown in FIG. 5, the card plate 33 may be a board formed by integrating a metal portion and a non-metal portion. The two hooks 331 may be metal, and the portion between the two hooks 331 may be non-metal. The two hooks 331 may be elastically bent relative to the portion connected to the button cap 32, such that the snap board 33 may be easily received in the button hole 11.

Figure 6:
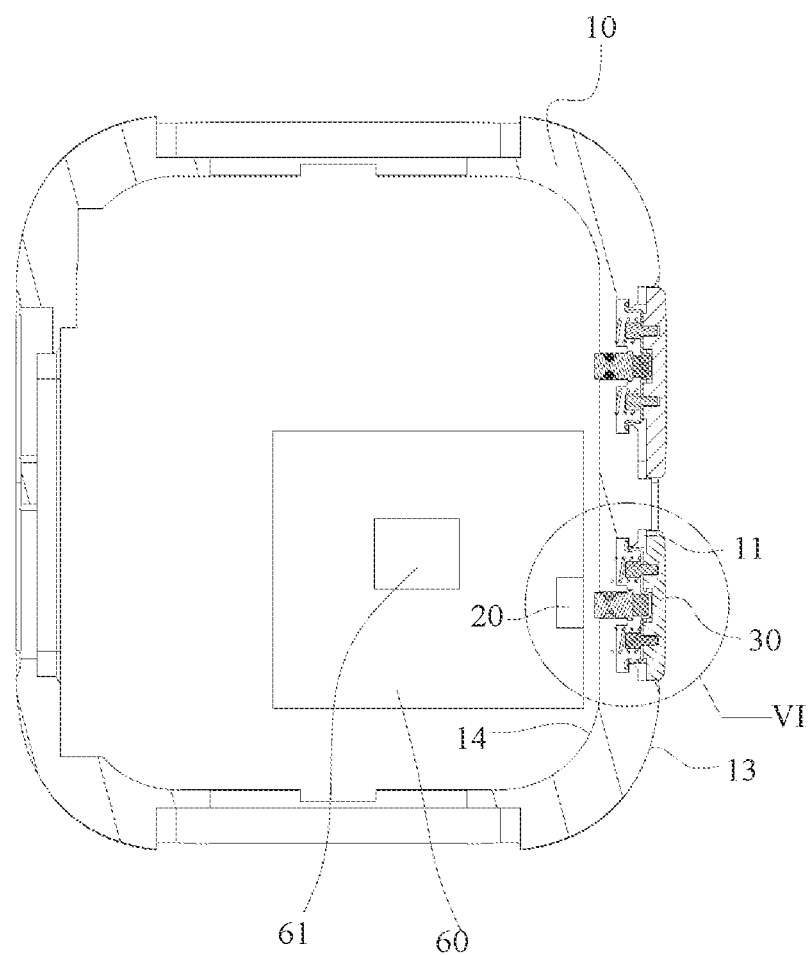
FIG. 6 is another cross-sectional view of an electronic device according to an embodiment of the present disclosure.
Figure 7:
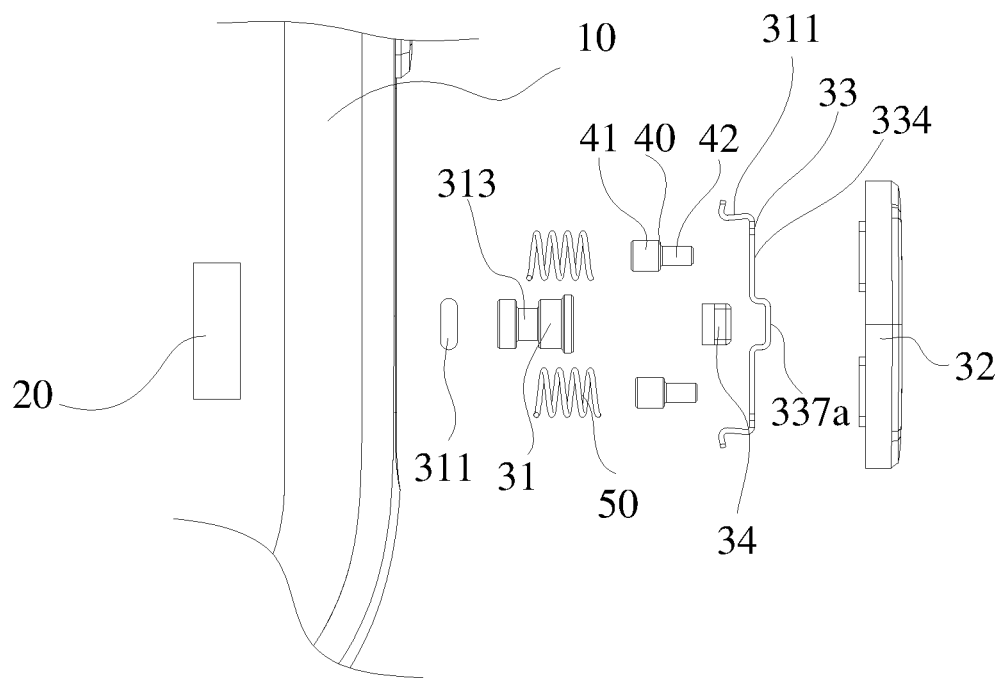
FIG. 7 is an exploded perspective view of a portion of an electronic device according to an embodiment of the present disclosure.
Figure 8:
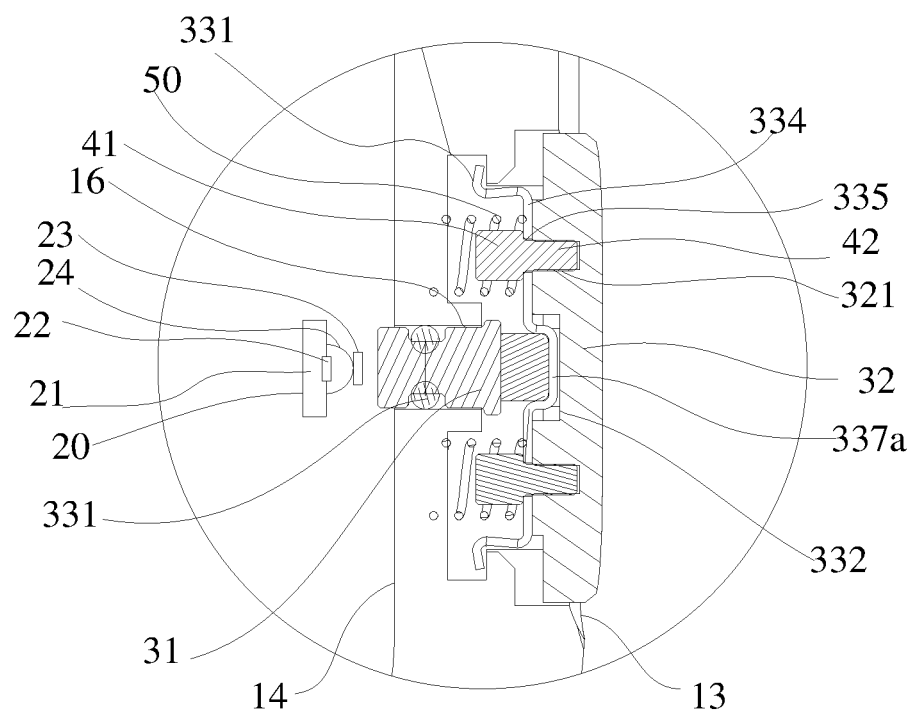
FIG. 8 is an enlarged view of a portion VI of the electronic device shown in FIG. 6.

Further, as shown in FIG. 6, FIG. 7, and FIG. 8, in the present embodiment, the button cap 32 may define two rivet holes 321. The two rivet holes 321 are respectively defined at two ends of the button cap 32 along the length direction. Each of the two rivet holes 321 may extend from the side of the button cap 32 facing the button post 31 to the side of the button cap away from the button post 31. The button 30 may further include two rivets 40 passing through the snap board 33 and being received in the two rivet holes 321 respectively with an interference fit.

Each of the two rivet holes 321 may extend from a face of the button cap 32 facing the bottom of the button hole 11 to another face of the button cap 32. Each of the two rivet holes 321 may be defined at the end of the button cap 32, such that the two ends of the snap board 33 may respectively be secured to the two ends of the button cap 32. Each of the two rivets 40 may include a rivet cap 41 and a rivet post 42 extending from the rivet cap 41. Two through holes 335 may respectively be defined at two ends of the connection arm 334 of the snap board 33 adjacent to the two hooks 331. The two through holes 335 may correspond to the two rivet holes 321 in the button cap 32. The rivet post 42 may extend through each of the through holes 335 to further be received in each of the two rivet holes 321. An outer circumferential wall of rivet post 42 may be engaged with an inner circumferential wall of each of the two rivet holes 321 with an interference fit. The rivet cap 41 may abut against the connection arm 334 at a position close to an opening end of each of the two through holes 335, such that the rivet cap 41 and the button cap 32 may clamp the connection arm 334 cooperatively, enabling the snap board 33 to be secured to the button cap 32. By engaging the rivet post 42 with each of the two rivet holes 321 with the interference fit, it is only required to apply the pressing force to the button cap to allow the button cap 32 to be fastened to the snap board 33 effectively. While assembling the button cap 32, the rivet may be configured to extend through each of the two through holes 335 of the snap board 33 firstly. Subsequently, the rivet and the snap board 33 may both be received into the button hole 11. At last, the button cap 32 may be engaged with the rivet 40 to enable the snap board 33 to be fastened to the button cap 32.

Figure 9:
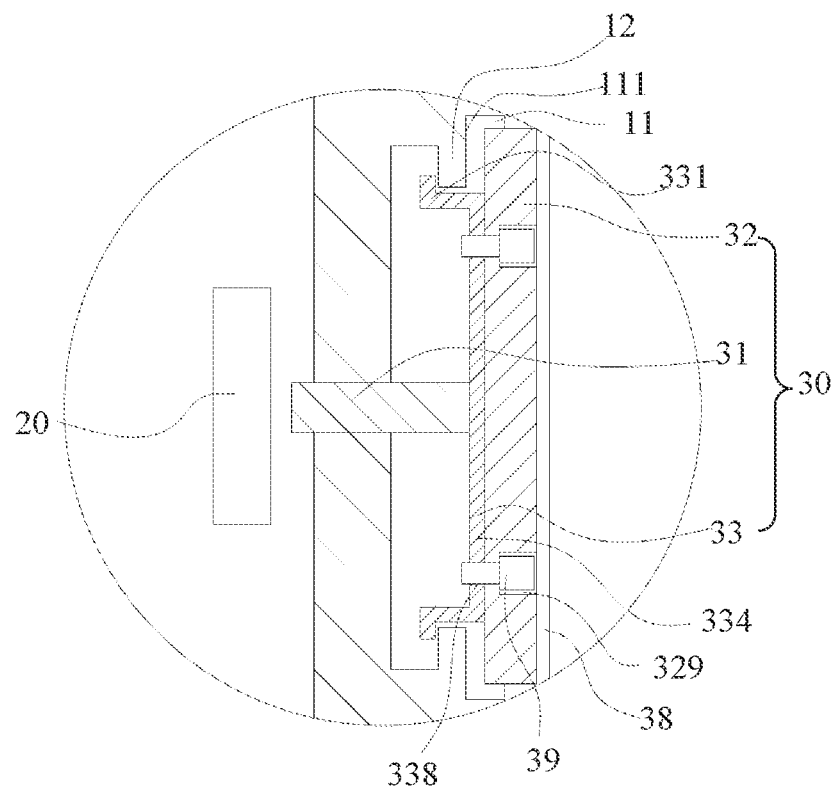
FIG. 9 is an enlarged view of a portion of an electronic device according to another embodiment of the present disclosure.

In another embodiment, as shown in FIG. 9, the embodiment may substantially be the same as the embodiment shown in FIG. 8. However, the snap board 33 may be connected to the button cap 32 through a bolt. In detail, the button cap 32 may define a first screw hole 329. The button 30 may further include a screw 39 extending through the first screw hole 329. The snap board 33 may define a second screw hole 338 corresponding to the first screw hole 329. An end of the screw 39 may extend through the first screw hole 329 and further be screwed into the second screw hole 338, such that the snap board 33 may be secured to the button cap 32 via the screw 39. While assembling the button cap 32, the snap board 33 may be received into the button hole 11 firstly. Subsequently, the button cap 32 may abut against the snap board 33. At last, the screw 39 may be received into the first screw hole 329 from the outer side face 13 of the button cap 32, and the end of the screw 39 may further be screwed into the second screw hole 338, such that the snap board 33 may be secured to the button cap 32. It should be understood that, in order to provide an aesthetic appearance for the button 30, the button 30 may further include a cover plate 38 covering an outer side of the button cap 32. The cover plate 38 may be bonded to the button cap 32. After the button cap is screwed to the snap board 33, the cover plate 38 may be bonded to the button cap 32.

Further, as shown in FIG. 6, FIG. 7, and FIG. 8, in the present embodiment, the button cap 32 may define a fastening groove 322. The fastening groove 322 may be defined by the side of the button cap 32 facing the button post 31 being recessed towards the side of the button cap 32 away from the button post 31. An outer face of the snap board 33 between the two rivets 40 facing the button cap 32 may protrude towards the button cap to form a protrusion 337*a*, and an inner face of the snap board 33 facing the button post 31 may be recessed at a position corresponding to the protrusion 337*a* to define a recess 337*b*. The protrusion 337*a* may be fixedly received in the fastening groove 322. An end of the button post 31 may be connected to the button cap 32 and the snap board 33 through the protrusion 337*a*.

In the present embodiment, the fastening groove 322 may be defined by the side of the button cap 32 facing the bottom of the button hole 11 being recessed inwardly. The protrusion 337*a* of the snap board 33 may be formed by a punching process. A bottom wall of the recess 337*b* may serve as a side of the protrusion 337*a* facing the bottom wall of the button hole 11. The end of the button post 31 away from the signal triggering element 20 may be directly and fixedly received in the recess 337*b*. Alternatively, the button post 31 may be received in the recess 337*b* to connect to the button cap 32 indirectly via other elements.

In detail, the button 30 may further include an elastic gasket 34 fixedly connected to the button post 31 and the snap board 33. At least a portion of the elastic gasket 34 may be fixedly received in the recess 337*b*. The button post 31 may be fixedly connected to the snap board 33 and fixedly connected to the button cap 32 through the elastic gasket 34.

By pressing the button cap 32, the button cap 32 may transfer the pressing torque to the button post through the snap board 33 and the elastic gasket 34, such that the button post 31 may trigger the signal triggering element 20 to transmit the signal, such that the electronic device 100 may be controlled.

In the art, the button cap 32 and the button post 31 of the button 30 may be an integral structure, or a structure that is securely fixed by other means. Generally, the two ends of the button cap 32 may be relatively long. In response to one end of the button cap 32 being pressed, the other end may be lifted. At the same time, the electronic device 100 may be configured with a guide structure to guide the button post 31 to slide. After the button cap 32 is lifted, the button post 31 and the guide structure may be non-coaxial, causing the button 30 to be jammed. According to the present disclosure, the button post 31 and the button cap 32 may not be integrally configured as an overall structure, and the button cap 32 may be movably connected to the button post 31, such that the button cap 32 may receive the pressing force in various manners. Even if the button cap 32 is lifted, a situation of the button post 31 being non-coaxial with the guide structure may not occur, ensuring the effectivity of the button 30.

In the present embodiment, the elastic gasket 34 may be connected between the button cap 32 and the button post 31. The button cap 32 may be movable relative to the button post 31 by elastic deformation performance of the elastic gasket 34. In this way, a situation of the button post 31 being tilted and jammed in response to the button cap 32 being lifted may be avoided, preventing failure of the button 30, ensuring performance of effective pressing applied to the button 30, and improving service life of the button 30.

While assembling the button 30, the button post 31 may be configured to extend through the side frame 10 firstly to enable the end of the button post 31 to face the signal triggering element 20. Subsequently, the elastic gasket 34 may be fixed to the end of the button post 31 away from the signal triggering element 20, such that the button post 31 may be fixedly connected to the elastic gasket 34. Further, the snap board 33 may be received into the button hole 11, and the two hooks 331 may hook the two limiting protrusions 12. At last, the button cap 32 may be configured to the side frame 10, such that the button cap 32 may be fastened to the snap board 33, and the fastening groove 322 of the button cap 32 may be engaged with the protrusion 337a of the snap board 33. In this way, the snap board 33 may further be secured to the button cap 32, and connection between the elastic gasket 34 and the button cap 32 may further be secured.

It should be understood that, in response to one end of the button cap 32 being lifted due to a direction in which the button cap 32 receives the pressing force being offset relative to the button post 31, an end of the elastic gasket 34 may be compressed and deformed, and another end may be stretched and deformed, that is, the elastic gasket 34 absorbs a tilting force applied from the button cap 32. In this way, the tilting force applied from the button cap 32 may be prevented from being transferred to the button post 31, preventing the button post 31 from tilting. As the elastic gasket 34 is connected to the button post 31 and the button cap 32, the button cap 32 may not directly contact the button post 31. The button post 31 may be maintained as facing the signal triggering element 20 along the length direction. The button post 31 may effectively trigger the signal triggering element 20, and may be reset effectively, avoiding a situation of the button post 31 being jammed.

The elastic gasket 34 may substantially be perpendicular to the length direction of the button post 31. A face of elastic gasket 34 having a relatively large area may be attached to an end face of the button post 31. Another face of elastic gasket 34 having a relatively large area may be attached to the bottom wall of the recess 337b. The button cap 32 may completely cover the elastic gasket 34 to ensure the button cap 32 and the snap board 33 to contact the elastic gasket 34 effectively.

Alternatively, the face of the elastic gasket 34 connecting to the button post 31 may cover the end face of the button post 31 completely.

Alternatively, the face of the elastic gasket 34 connecting to the button post 31 may partially cover the end face of the button post 31.

In the present embodiment, the elastic gasket 34 may be a silicone gasket. The elastic gasket 34 may be bonded to the button post 31 and the snap board 33 through double-sided adhesives. The snap board 33 may define the recess 337b between the two through holes 335. A portion of the elastic gasket 34 may be fixedly received in the recess 337b to increase security between the elastic gasket 34 and the snap board 33 and security between the elastic gasket 34 and the button cap 32. As the elastic gasket 34 has elastic compressibility, the elastic gasket 34 may effectively compensate a tolerance between the button cap 32 and the button post 31, such that functions of the button 30 may be ensured within a certain tolerance range. As the elastic gasket 34 has elastic cushioning performance, under extreme conditions, the button 30 may transmit an impact force to the elastic gasket 34 during collision, and the elastic gasket 34 may absorb the impact force, such that the button post 31 may be avoided from receiving the impact force to trigger the signal triggering element 20, failure of the electronic device 100 may be avoided while being dropped, such that the service life of the electronic device 100 may be ensured.

Alternatively, the elastic gasket 34 may be bonded to a wall of the recess 337b through glue, and the recess 337b may prevent the glue from spilling out.

Alternatively, the elastic gasket 34 may be completely and fixedly received in the recess 337b.

Alternatively, the elastic gasket 34 may be a metal elastic gasket. The elastic gasket 34 may be bonded to the snap board 33 and the button post 31 through the glue.

Alternatively, the elastic gasket 34 may also be an elastic foam sheet.

In other embodiments, a portion of the snap board 33 directly facing the button post 31 may define a through hole. The elastic gasket 34 may be fixed to the end portion of the button post 31 and extend through the through hole to securely connect to the button cap 32.

Further, the button 30 may further include two elastic elements 50. The two elastic elements 50 may sleeve on the two rivets 40 respectively, and may be elastically compressed between the button cap 32 and the bottom wall of the button hole 11.

In the present embodiment, each of the two elastic elements 50 may be a rectangular spring. One end of each of the two elastic elements 50 may sleeve on the rivet cap 41, such that the rivet cap 41 may be configured to guide compression of each of the two elastic elements 50, and to improve security between the two elastic elements 50 and the button cap 32 and security between the two the elastic element 50 and the snap board 33. A face of each of the two elastic elements 50 away from the snap board 33 may abut against the bottom wall of the button hole 11. When the hook 331 hooks the limiting protrusion 12, the button cap 32 may not continue to slide out of the button hole 11 due to limitation of the limiting protrusion 12, and the elastic elements 50 may be pre-compressed between the button cap 32 and the side frame 10. The two elastic elements 50 may provide an elastic resetting force for the button cap 32 to move away from the bottom wall of the button hole 11, such that the button cap 32 may be automatically reset by the elastic force of the elastic elements 50 after the pressing force is removed. Of course, in other embodiments, the elastic elements 50 may be any one of: a torsion spring, an elastic silicone block, and an elastic rubber block.

Alternatively, the bottom wall of the button hole 11 directly facing the rivet cap 41 may define an engaging hole. An end of each of the two elastic elements 50 away from the snap board 33 may be fixedly received in the engaging hole, such that the security between the two elastic elements 50 and the side frame 10 may be improved through the engaging hole, and a direction of the two elastic elements 50 being compressed and deformed may be guided by an inner wall of the engaging hole.

Alternatively, a column may be arranged at the bottom of the button hole 11. The end of each of the two elastic elements 50 away from the snap board 33 may sleeve on the column. The end of each of the two elastic elements 50 away from the bottom of the button hole 11 may extend through the snap board 33 to be inserted into the button cap 32, such that the two elastic elements 50 may be fixedly connected to the button cap 32 and the side frame 10.

Further, the button post hole communicating with the button hole 11 may serve as a button guide hole 16. The button post 31 may extend through the button guide hole 16 and engaged with the button guide hole 16 with a clearance fit.

In the present embodiment, the button guide hole 16 may guide a direction of the button being pressed and sliding, such that the button post 31 may be maintained as sliding towards the signal triggering element 20 along a fixed direction. The button guide hole 16 may extend from the inner side face 14 towards the outer side face 13. The button guide hole 16 may extend through the inner side face 14 and may communicate with the button hole 11, such that an end of the button post 31 may protrude from the inner side face 14 of the side frame 10 by being pressed. An inner circumferential wall of the button guide hole 16 may effectively guide a direction of the button post 31 sliding relative to the side frame 10, such that the button post 31 may be maintained as sliding towards the signal triggering element 20 along a direction substantially facing the signal triggering element 20.

Alternatively, a length of the button post 31 may be greater than a depth of the button guide hole 16, such that the end of the button post 31 may protrude from the button guide hole 16.

Alternatively, an end of the button guide hole 16 away from the inner side face 14 may substantially adjacent to the outer side face 13, such that a relatively large portion of the button cap 32 may be exposed out of the outer side face 13, and the button cap 32 may receive the pressing force easily.

Alternatively, the end of the button guide hole 16 away from the inner side face 14 may be configured between the outer side face 13 and the inner side face 14, such that there may be a certain security distance between the button guide hole 16 and the outer side face 13, any dust and impurities out of the side frame 10 may be prevented from entering the button guide hole 16 to interfere the button post 31 sliding relative to the side frame 10.

Further, the end of the button post 31 away from the button cap 32 may be configured with a seal ring 311 along a circumferential direction. An outer circumferential wall of the seal ring 311 may be engaged with the inner circumferential wall of the button guide hole 16 with an interference fit.

In the present embodiment, the seal ring 311 has elastic deformation performance. An outer diameter of the seal ring 311 in a natural relaxed state may be greater than an inner diameter of the button guide hole 16. After the seal ring 311 received into the button guide hole 16 along with the button post 31, the seal ring 311 may be compressed and deformed by the inner circumferential wall of the button guide hole 16, such that the seal ring 311 may be in close contact with the inner circumferential wall of the button guide hole 16, and the seal ring 311 may fill a gap between the inner circumferential wall of the button guide hole 16 and the outer circumferential wall of the button post 31. The seal ring 311 may effectively prevent water, dust and impurities from entering the inner side of the side frame 10 from the gap between the outer circumferential wall of the button post 31 and the inner circumferential wall of the button guide hole 16. For example, the electronic device 100 may be the smart watch, and the seal ring 311 may be disposed between the inner circumferential wall of the button post 31 and the button guide hole 16 for sealing, such that the electronic device 100 can meet a 5 ATM waterproof requirement.

In detail, an end of the button post 31 away from the elastic gasket 34 may define a locking groove 313 along a circumferential direction. A width of the locking groove 313 may approximately be equal to a difference between the outer diameter and the inner diameter of the seal ring 311. The seal ring 311 may sleeve on a circumferential side of the button post 31, and the seal ring 311 may be partially received into the locking groove 313. The seal ring 311 may be detachably connected to the button post 31 to facilitate the disassembling and maintenance of the seal ring 311. While assembling the button 30 to the side frame 10, the seal ring 311 may first sleeve on the circumferential side of the button post 31. Subsequently, the button post 31 and the seal ring 311 may be integrated and received into the button guide hole 16. A fit gap between the button hole 11 and the button cap 32 may be greater than the gap between the button guide hole 16 and the button post 31, such that the outer wall of the button cap 32 may be prevented from being stuck with the inner circumferential wall of the button hole 11 in response to an end of the button cap 32 being lifted. In this way, after the button cap 32 is pressed, even if an end is lifted, the button post 31 may be retracted and extended relative to the side frame 10, and the button cap 32 may be effectively reset.

Alternatively, the seal ring 311 and the button post 31 may be integrally formed to improve sealing between the seal ring 311 and the button post 31.

Alternatively, material of the seal ring 311 may be silicone, such that elastic sealing performance and friction resistance performance of the seal ring 311 may be improved.

Alternatively, the material of the seal ring 311 may be rubber, such that service life of the seal ring 311 may be improved.

Figure 10:
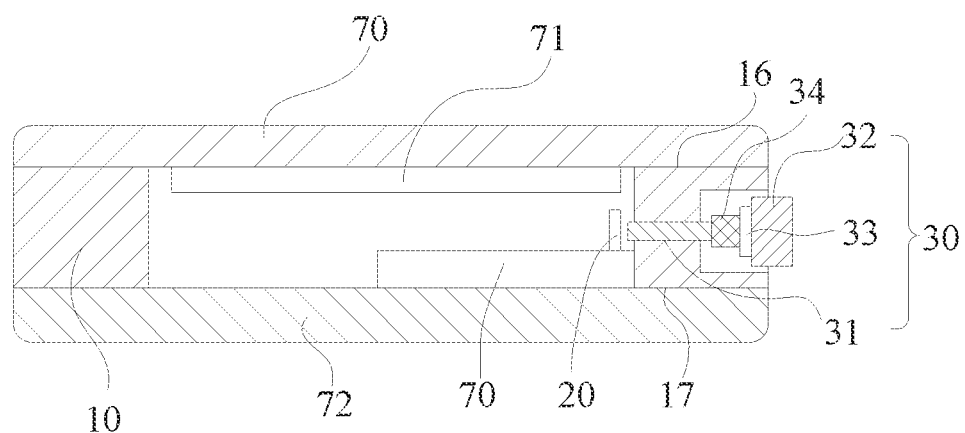
FIG. 10 is a cross-sectional view of an electronic device according to an embodiment of the present disclosure.
Figure 11:
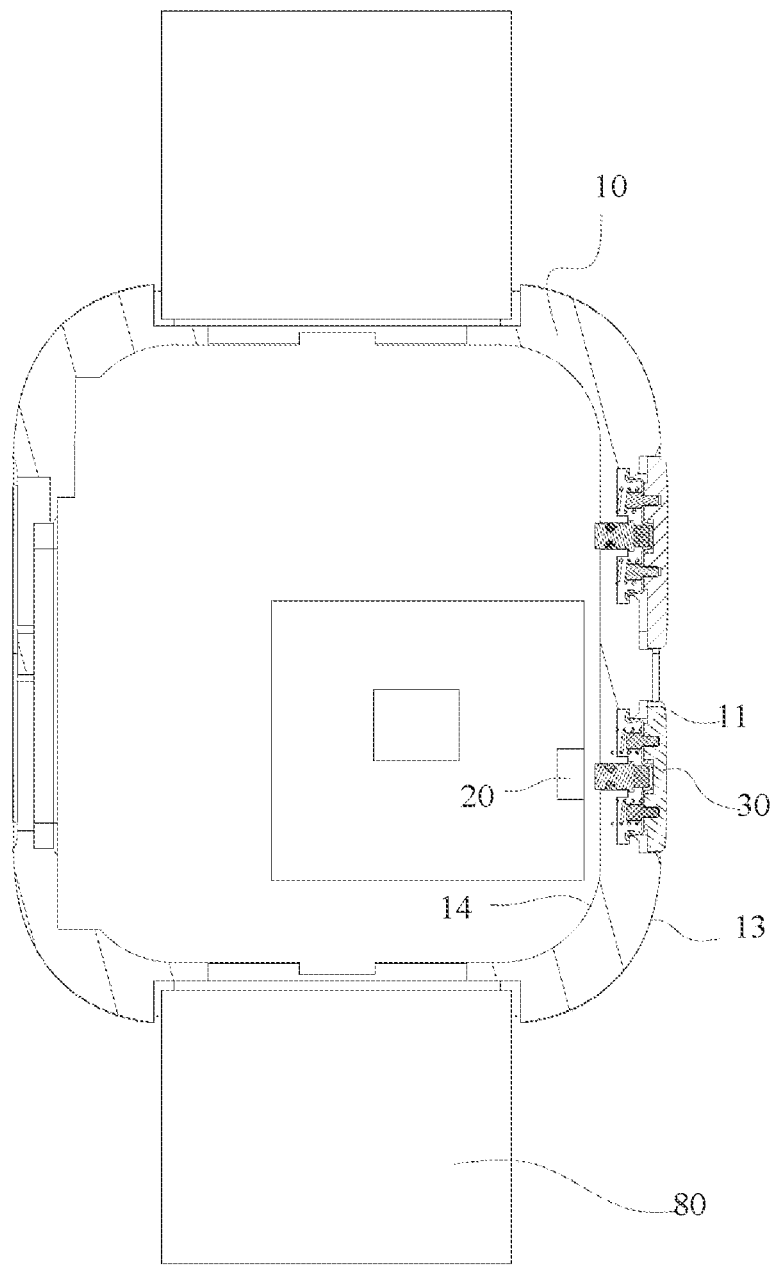
FIG. 11 is a cross-sectional view of an electronic device according to an embodiment of the present disclosure.

Further, as shown in FIG. 8, FIG. 10 and FIG. 11, the electronic device 100 may further include a main board 60 fixedly connected to the side frame 10. The signal triggering element 20 may be disposed on the main board 60.

In the present embodiment, the main board 60 may be fixedly received in the receiving space 15. The signal triggering element 20 may be disposed on an edge of the main board 60 adjacent to the inner side face 14. A processor 61 may be configured on the main board 60. The signal triggering element 20 may be electrically connected to the processor 61 to transmit the electrical signal to the processor 61. The processor 61 may process the electrical signal transmitted from the signal triggering element 20 into various controlling instructions, and may transmit the various controlling instructions to various functional elements of the electronic device 100, such that using the button 30 to control the various function elements of the electronic device 100 to work may be achieved.

In detail, the signal triggering element 20 may include a trigger base 21, a static contact 22 disposed on the trigger base 21, a movable contact 23 opposite to the static contact 22, and an elastic resetting element 24 connected between the static contact 22 and the movable contact 23. An end of the button post 31 may abut against and connect to the movable contact 23. The trigger base 21 may be fixedly disposed on a substrate of the main board 60. A direction along which the static contact 22 is contacted by the movable contact 23 may coincide with an axis of the button post 31, such that the button post 31 may easily slide to press the movable contact 23 to contact the static contact 22. In response to the movable contact 23 contacting the static contact 22, a logic circuit of the signal triggering element 20 may be conducted or disconnected to generate the electrical signal.

Alternatively, the elastic resetting element 24 may be a metal elastic sheet. The elastic resetting element 24 may be insulated from the movable contact 23 by an insulating element, and may be configured to ensure the movable contact 23 to be automatically reset after the movable contact 23 contacts the static contact 22.

Alternatively, a space may be defined between the button post 31 and the movable contact 23.

Alternatively, the button post 31 may abut against and connected to the movable contact 23.

Alternatively, the signal triggering element 20 may be a pressure sensor. The signal triggering element 20 may receive the press of the button post 31 through a pressure sensing sheet to trigger the electrical signal.

Further, the electronic device 100 may further include a front cover, such as a light-transmitting cover 70, covered with the side frame 10, and a display screen 71 attached to the light-transmitting cover 70 and disposed between the light-transmitting cover 70 and the side frame 10. The electronic device 100 may further include a back plate 72 covered with a side of the side frame 10 away from the light-transmitting cover 70.

In the present embodiment, the front cover, such as the light-transmitting cover 70, and the back plate 72 respectively cover the first end face 16 and the second end face 17 of the side frame 10. The light-transmitting cover 70 may be connected to and sealed with the side frame 10, and the back plate 72 may be connected to and sealed with the side frame 10, ensuring the waterproof requirement of the electronic device 100. The display screen 71 may be electrically connected to the main board 60 to receive a control signal of the processor 61, such that the display screen 71 may display images.

In one embodiment, the electronic device 100 may further include a wearable accessory 80, and the wearable accessory 80 may be detachably connected to the side frame 10. The wearable accessory 80 may be a watch strap. Ends of the wearable accessory 80 may be detachably connected to two opposite sides of the side frame 10. A side of the side frame 10 being connected to the wearable accessory may be adjacent to a side where the button 30 is arranged. The electronic device 100 may be a smart watch. Four sides of the side frame 10 may have approximately a same length. The side frame 10 may be configured with a plurality of buttons 30 on both sides adjacent to the wearing accessory. The plurality of buttons 30 may be used to control electronic device 100.

Alternatively, the electronic device 100 may also be a smart wristband. The wearable accessory 80 may be a wrist strap.

Figure 12:
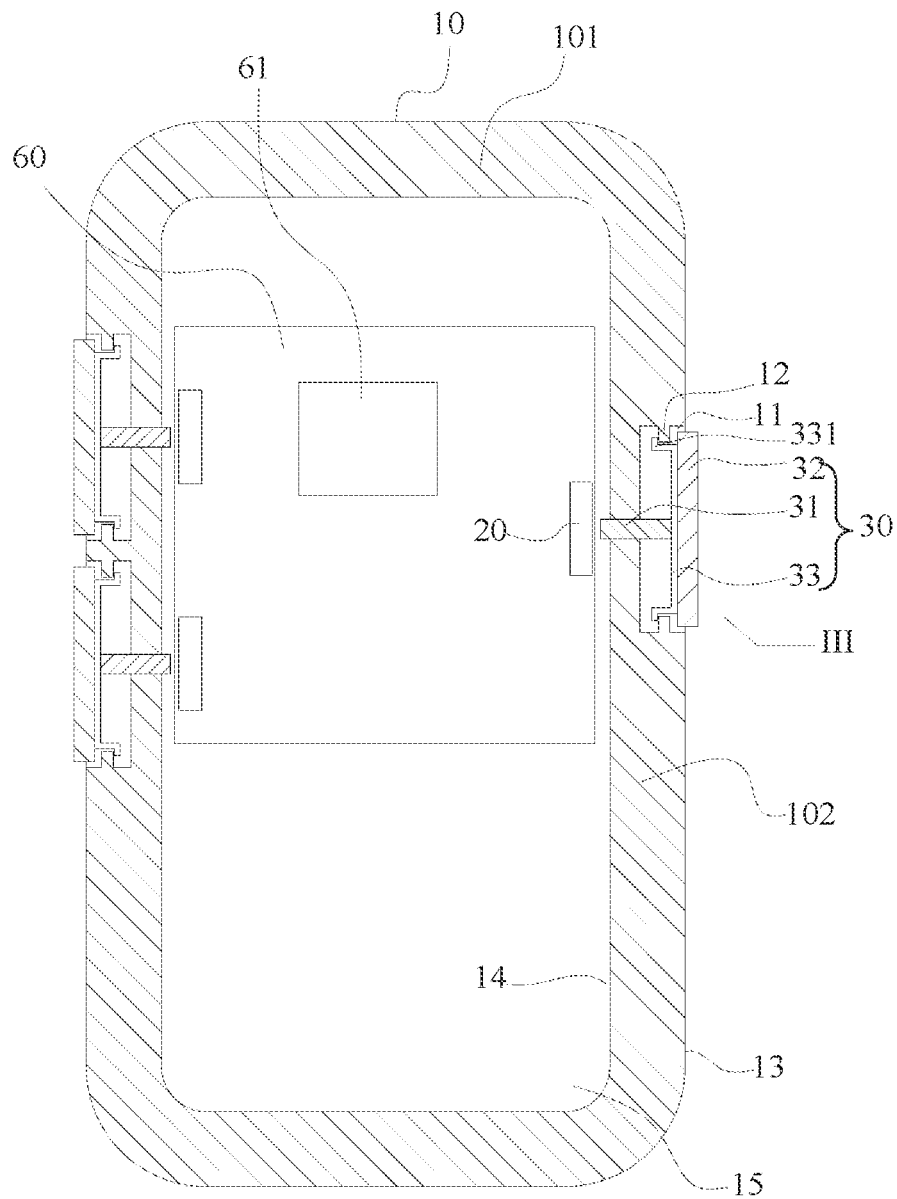
FIG. 12 is a cross-sectional view of an electronic device according to another embodiment of the present disclosure.

In another embodiment, as shown in FIG. 12, the electronic device 100 may be a mobile phone. The side frame 10 may have two relatively short sides 101 and two relatively long sides 102. The button 30 may be configured on and extend through one of the two long sides 102.

Alternatively, each of the two long sides of the electronic device 100 may be configured with at least one button 30.

Alternatively, two buttons 30 may be configured on one of the two long sides 102 of the electronic device 100, and the two buttons 30 may be a volume up key and a volume down key.

Alternatively, the button 30 may be configured on one of the two long sides 102 of the electronic device 100. The button 30 may be a screen wake-up button, and the button 30 may also perform a function of switching on and off the mobile phone.

Alternatively, the button 30 may also be configured on each of the two short sides 101 of the side frame 10.

Figure 13:
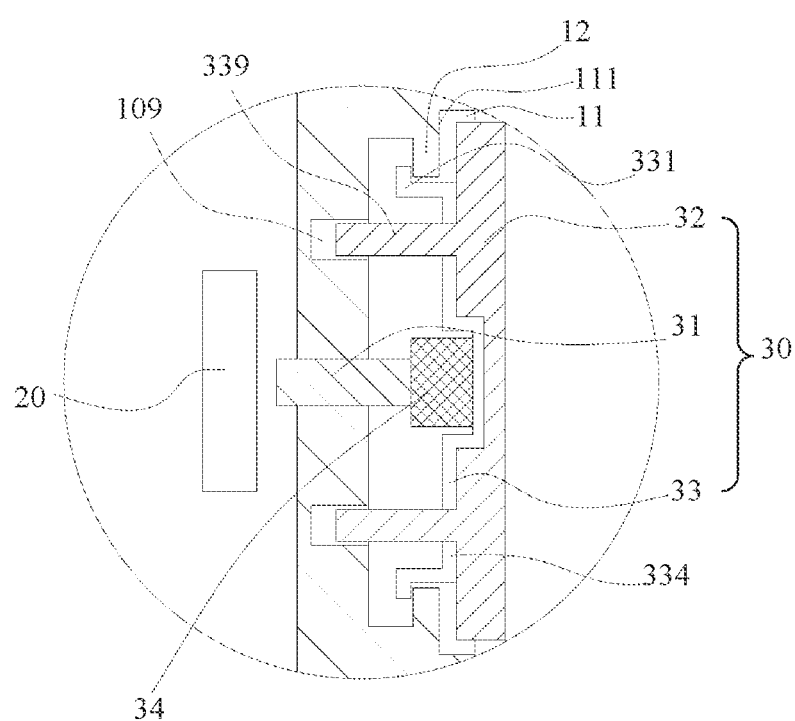
FIG. 13 is an enlarged view of a portion of an electronic device according to another embodiment of the present disclosure.

Further, as shown in FIG. 13, two opposite ends of the side of the button cap 32 facing the signal triggering element 20 may be configured with two guide posts 339, respectively. The bottom wall of the button hole 11 may define two guide holes 109, and the two guide posts 339 are received in the two guide holes 109. Outer walls of the two guide posts 339 may be engaged with inner walls of the two guide holes with a clearance fit. The elastic gasket 34 and the button post 31 may be disposed between the two guide posts 339. By receiving the two guide posts 339 into the two guide holes 109, the two ends of the button cap 32 may be guided to slide effectively, the button cap 32 may be prevented from being lifted to a large extent, and the effectivity of the button 30 may be ensured.

Figure 14:
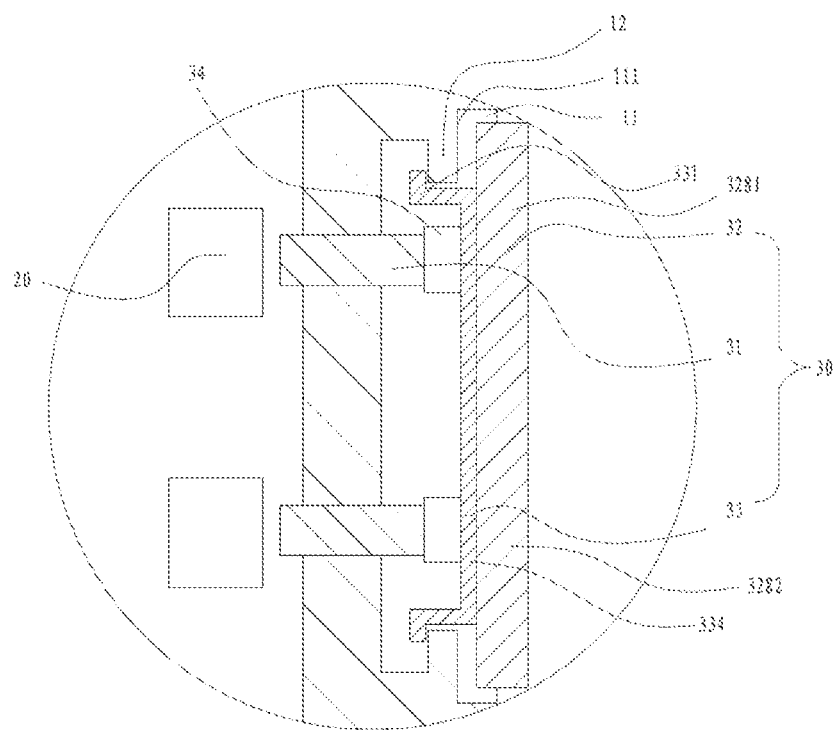
FIG. 14 is an enlarged view of a portion of an electronic device according to another embodiment of the present disclosure.

In another embodiment, as shown in FIG. 14, the button cap 32 may be configured with a plurality of pressing portions along the length direction. The button 30 may include a plurality of button posts 31, and the plurality of button posts 31 may respectively face towards the plurality of pressing portions and connect to the button cap 32. The electronic device 100 may include a plurality of signal triggering elements 20, and the plurality of signal triggering elements 20 may respectively be disposed adjacent to ends of the plurality of button posts 31.

Alternatively, the button cap 32 may be configured with a first pressing portion 3281 and a second pressing portion 3282 spaced apart from the first pressing portion 3281 along the length direction. The button 30 may include two button posts 31 and two elastic gaskets 34. The two button posts 31 may respectively face the first pressing portion 3281 and the second pressing portion 3282. The two elastic gaskets 34 may face the first pressing portion 3281 and the second pressing portion 3282 respectively. The electronic device 100 may include two signal triggering elements 20 fixedly received inside the side frame 10, and the two signal triggering elements 20 may respectively be disposed adjacent to the two button posts 31. By pressing the first pressing portion 3281, the first pressing portion 3281 may transfer the pressing force to the elastic gasket 34 corresponding to the first pressing portion 3281, and the pressing force may further be transferred to the button post 31 corresponding to the first pressing portion through the elastic gasket 34. Finally, the signal triggering element 20 corresponding to the first pressing portion 3281 may be triggered. Since the button cap 32 may be connected to the two button posts 31 through the two elastic gaskets 34, when the first pressing portion 3281 is pressed close to the bottom wall of the button hole 11, the second pressing portion 3282 may be lifted relative to the first pressing portion 3281, the second pressing portion 3282 may not exert a pressing effect on the elastic gasket 34 corresponding to the second pressing portion 3282, and the signal triggering element 20 corresponding to the second pressing portion 3282 may not be triggered. It should be understood that, the first pressing portion 3281 and the second pressing portion 3282 may be independent of each other, such that the two pressing portions of button cap 32 may trigger the two signal triggering elements 20 respectively. That is, pressing different portions of one button cap 32 may trigger different operation instructions to achieve multi-function control.

Figure 15:
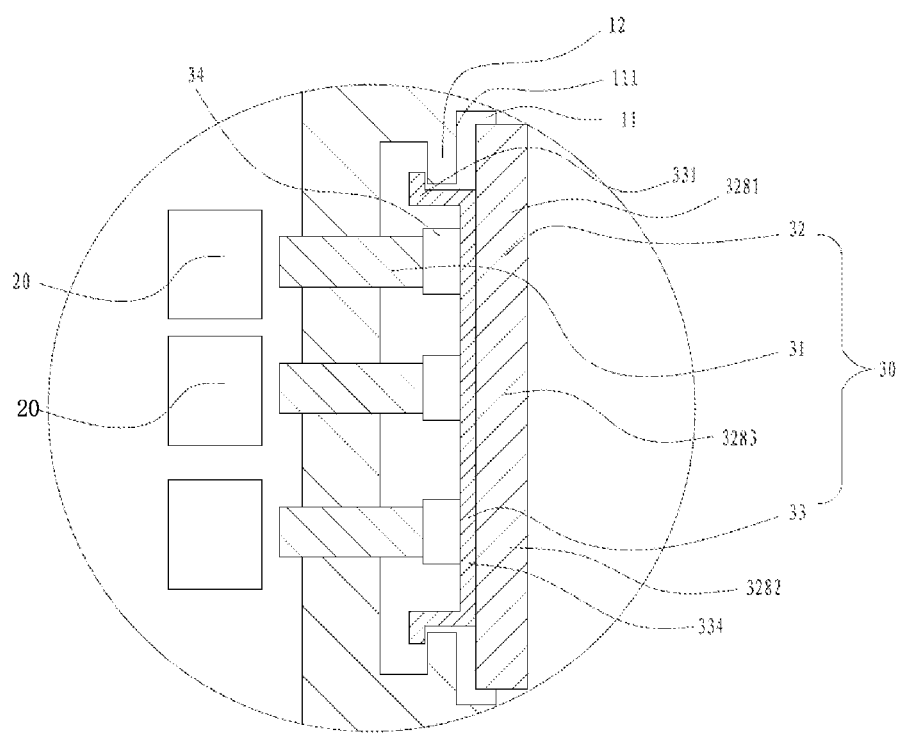
FIG. 15 is an enlarged view of a portion of an electronic device according to another embodiment of the present disclosure.

In another embodiment, as shown in FIG. 15, the button cap 32 may further be configured with a third pressing portion 3283 disposed between the first pressing portion 3281 and the second pressing portion 3282. The button 30 may include three button posts 31 and three elastic gaskets 34. The three button posts 31 may face the first pressing portion 3281, the second pressing portion 3282, and the third pressing portion 3283, respectively. The three elastic gaskets 34 may respectively face the first pressing portion 3281, the second pressing portion 3282, and the third pressing portion 3283. The electronic device 100 may include three signal triggering elements 20, fixedly received inside the side frame 10 and disposed respectively adjacent to the three button posts 31. It should be understood that, the first pressing portion 3281, the second pressing portion 3282, and the third pressing portion 3283 may be independent of each other, such that the button cap 32 may trigger the three signal triggering elements 20 respectively. That is, pressing different positions of the button cap 32 may trigger different operation instructions to achieve multi-function control.

Figure 16:
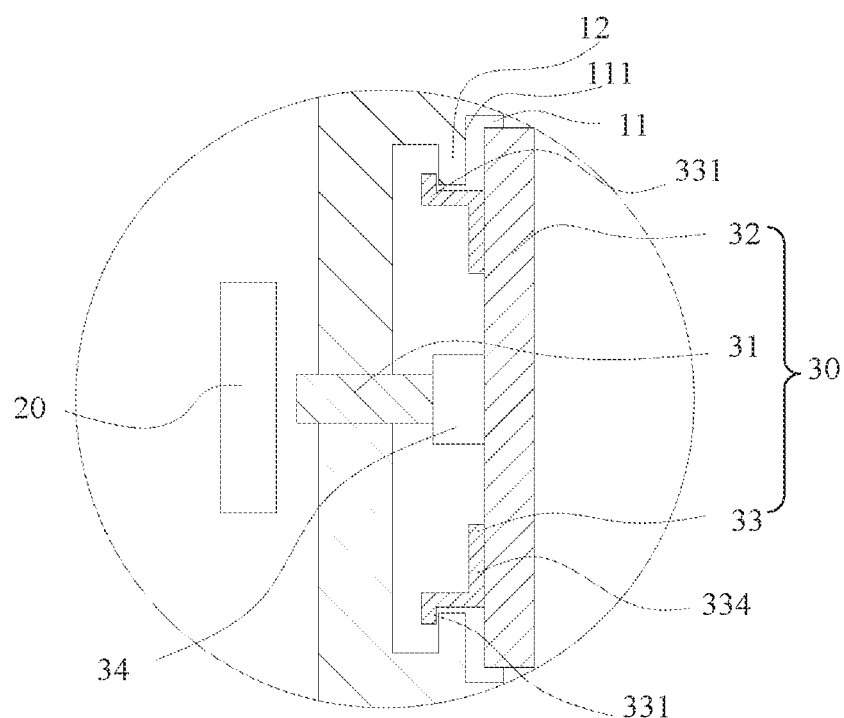
FIG. 16 is an enlarged view of a portion of an electronic device according to another embodiment of the present disclosure.

In another embodiment, as shown in FIG. 16, the button 30 may include two snap boards 33, the two snap boards 33 may be fastened to the two ends of the button cap 32 along the length direction. The button post 31 may be disposed between the two snap boards 33 and connected to the button cap 32. An end of each of the two snap boards 33 away from the button cap 32 may be configured with a hook 331, such that there may a secure sliding distance between the hook 331 and the button cap 32, and the limiting protrusion 12 may slide within the secure sliding distance. A side of each of the two snap boards 33 at which the hook 331 is configured may define a through hole 335. The rivet is configured to extend through the through hole 335. The two snap boards and the button cap 32 may be riveted by two rivets. An accommodating space may be defined between the two snap boards 33, and the accommodating space may be defined for the button post 31 and the elastic gasket 34 to connect to the button cap 32.

Figure 17:
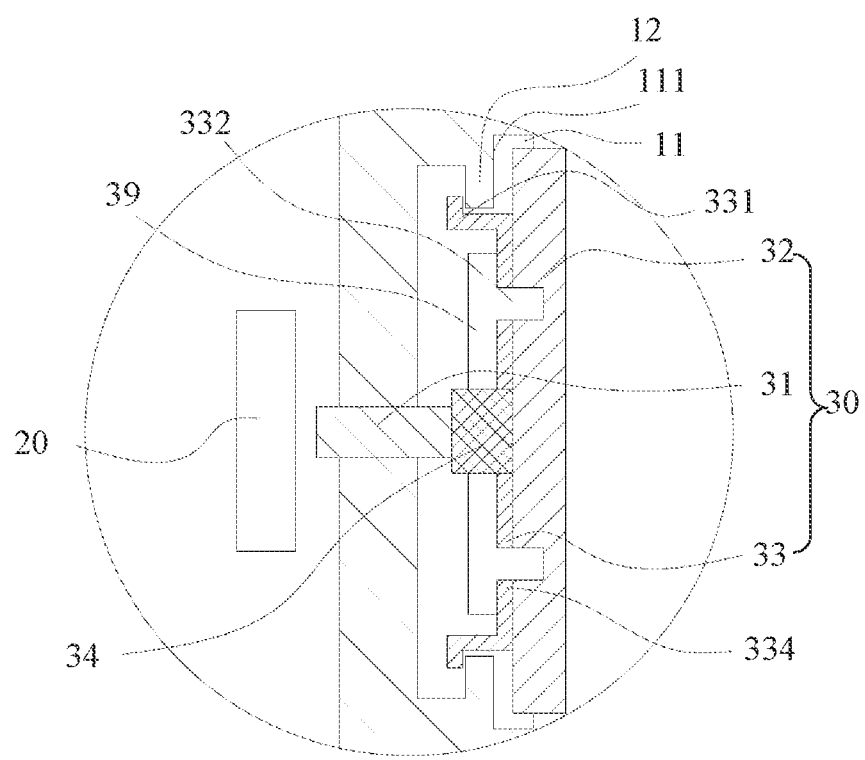
FIG. 17 is an enlarged view of a portion of an electronic device according to another embodiment of the present disclosure.

In another embodiment, as shown in FIG. 17, the button 30 may include a pressing plate 39 received in the button hole 11, and a side of the pressing plate 39 facing the button cap 32 may be configured with a buckle 332 engaged with the button cap 32. The pressing plate 39 may be fastened to the button cap 32 through the buckle 332. The snap board 33 may be clamped between the pressing plate 39 and the button cap 32. The hook 331 may protrude from the pressing plate 39, and the button post 31 may extend through the pressing plate 39 to connect to the button cap 32. The snap board 33 may be pressed to the side of the button cap 32 facing the button post 31 via the pressing plate 39, such that the snap board 33 and the button cap 32 may be securely combined, and the button cap 32 may be easily assembled with the snap board 33.

Figure 18:
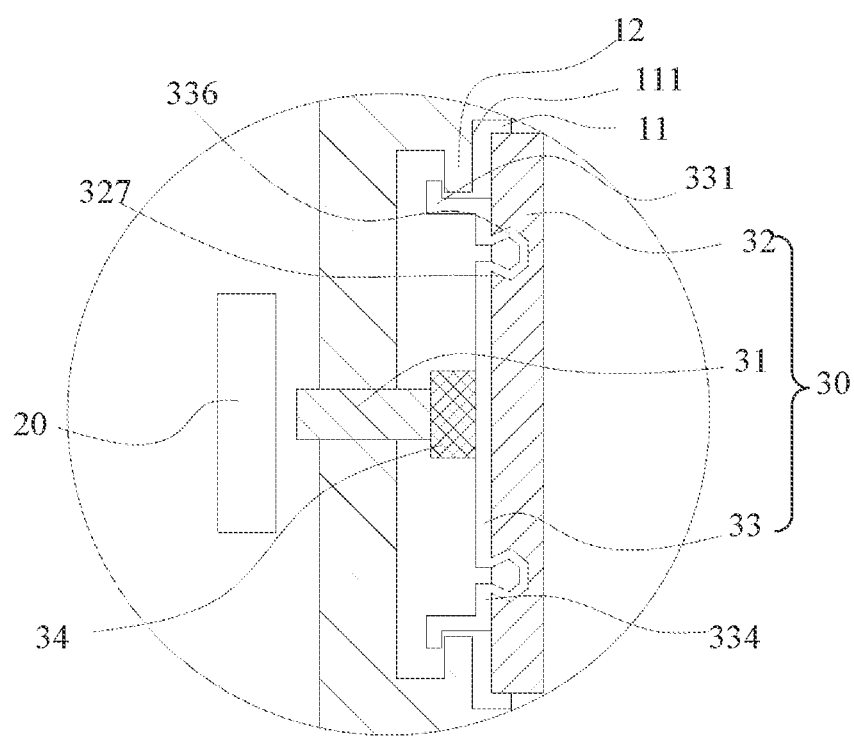
FIG. 18 is an enlarged view of a portion of an electronic device according to another embodiment of the present disclosure.

In another embodiment, as shown in FIG. 18, the snap board 33 may be configured with an elastic buckle 336. The side of the button cap 32 facing the signal triggering element 20 may define a buckle hole 327. The elastic buckle 336 may be fixedly fastened in the buckle hole 327. The elastic buckle 336 may be bent and formed by a pressing process. The buckle hole 327 may be defined by the side of the button cap 32 facing the button post 31 being recessed inwardly. The elastic buckle 336 of the snap board 33 may be received in the buckle hole 327 of the button cap 32 and fastened with a wall of the buckle hole 327, such that riveting the snap board 33 and the button cap 32 via the rivet may be avoided, security of assembling the snap board 33 with the button cap 32 may be improved, and production costs may be reduced.

The limiting protrusion may be disposed on the inner wall of the button hole. The button may include the snap board fastened to the side of the button cap facing the signal triggering element. The snap board may be configured with the hook, and the hook may engage with the limiting protrusion with an interference fit. The hook of the snap board allows the button cap to be limited securely and prevents the button cap from falling off. Further, the hook ensures the stability of the snap board and the button cap, such that stability of the button structure may be improved, and difficulties of assembling the button may be reduced.

The above description illustrates preferred embodiments of the present disclosure. It should be noted that, for any ordinary skilled person in the art, various improvements and modifications may be made without departing from the principle of the present disclosure, and these improvements and modifications should also be included in the scope of the present disclosure.

What is claimed is:
1. A button assembly, comprising a side frame, a signal triggering element fixedly disposed inside the side frame, and a button configured to extend through the side frame, wherein
    the side frame defines a button hole;
    a limiting protrusion is arranged on an inner wall of the button hole;
    the button comprises:
        a button post, received in the button hole to further extend through the side frame and disposed adjacent to the signal triggering element;
        a button cap, connected to the button post and at least partially received in the button hole; and
        a snap board, fastened to a side of the button cap facing the signal triggering element, wherein
        the snap board is configured with a hook engaged with the limiting protrusion for limiting;
        the button cap defines a fastening groove, the fastening groove is defined by a side of the button cap facing the button post being recessed inwardly;
        a portion of an outer face of the snap board facing the button cap is a protrusion, the protrusion is fixedly received in the fastening groove;

an inner face of the snap board facing the button post is recessed inwardly at a position corresponding to the protrusion to define a recess corresponding to the protrusion; and an end of the button post is connected to the snap board and the button cap through the recess.

2. The button assembly according to claim 1, wherein the side of the button cap facing the signal triggering element is configured with a guide post;

the guide post extends through the snap board, and a position of the snap board through which the guide post extends is at a side of the hook close to the button post; and the side frame defines a guide hole, the guide post is partially received in the guide hole, and an outer wall of the guide post is engaged with an inner wall of the guide post with a clearance fit.

3. The button assembly according to claim 1, wherein the button cap is configured with a plurality of pressing portions along a length direction of the button cap;

the button comprises a plurality of button posts, facing the plurality of pressing portions respectively and connected to the button cap; and an electronic device comprises a plurality of signal triggering elements, disposed adjacent to a plurality of end portions of the plurality of button posts respectively.

4. The button assembly according to claim 1, wherein the button comprises two snap boards, fastened to two ends of the button cap along a length direction of the button cap; and the button post is connected to a portion of the button cap between the two ends fastened to the two snap boards.

5. The button assembly according to claim 1, wherein the button comprises a pressing plate received in the button hole;

a side of the pressing plate facing the button cap is configured with a buckle engaged with the button cap;

the pressing plate is buckled with the button cap through the buckle;

the snap board is fastened between the pressing plate and the button cap;

the hook protrudes from the pressing plate; and the button post extends through the pressing plate to connect to the button cap.

6. The button assembly according to claim 1, wherein the snap board is configured with an elastic buckle;

a side of the button cap facing the signal triggering element defines a buckling hole; and the elastic buckle is fixedly buckled into the buckling hole.

7. The button assembly according to claim 1, wherein the button further comprises an elastic gasket fixedly connected to the button post and the snap board, and at least a portion of the elastic gasket is fixedly received in the recess.

8. The button assembly according to claim 1, wherein two limiting protrusions are disposed on two opposite inner walls of the button hole along a length direction of the button hole; and two ends of the snap board corresponding to two ends of the button cap along a length direction of the button cap are configured with two hooks respectively.

9. The button assembly according to claim 8, wherein the button cap defines two rivet holes at the two ends of the button cap along the length direction of the button cap;

each of the two rivet holes is defined by a side of the button cap facing the button post being recessed inwardly; and the button further comprises two rivets, extending through the snap board and received into the two rivet holes respectively, outer walls of the two rivets are engaged with inner walls of the two rivet holes with an interference fit.

10. The button assembly according to claim 9, wherein the button further comprises two elastic elements, the two elastic elements are configured to sleeve on two ends of the two rivets respectively, and the two elastic elements are elastically compressed between the button cap and the side frame.

11. The button assembly according to claim 1, wherein a side of the side frame close to the signal triggering element defines a button guide hole communicating with the button hole;

the button post is received in and extends through the button guide hole; and an outer wall of the button post is engaged with an inner circumferential wall of the button guide hole with a clearance fit.

12. The button assembly according to claim 11, wherein an end of the button post away from the button cap is configured with a seal ring along a circumferential direction of the button post, and an outer circumferential wall of the seal ring is engaged with the inner circumferential wall of the button guide hole with an interference fit.

13. An electronic device, comprising:

a front cover and a back cover, disposed spaced apart from each other and opposite to each other;

a side frame, connected between the front cover and the back cover to define a receiving space, wherein the side frame further defines a through hole communicating to the receiving space and an external environment of the electronic device; and a pressing assembly engaged with the side frame and at least partially received in the receiving space;

wherein the pressing assembly comprises:

a signal triggering element, fixedly received in the receiving space;

a limiting member, disposed on an inner wall of the through hole and protruding towards the through hole;

a button post, received in the through hole, wherein an end of the button post is disposed adjacent to but spaced apart from the signal triggering element in a first state, and the end of the button post is in contact with the signal triggering element in a second state;

a button cap, at least partially received in the through hole and connected to the other end of the button post; and a snap board, fastened to a side of the button cap facing the signal triggering element and configured with a hook engaged with the limiting member in the first state, wherein the button cap defines a fastening groove, the fastening groove is defined by a side of the button cap facing the button post being recessed inwardly;

a portion of an outer face of the snap board facing the button cap is a protrusion, the protrusion is fixedly received in the fastening groove;

an inner face of the snap board facing the button post is recessed inwardly at a position corresponding to the protrusion to define a recess corresponding to the protrusion; and an end of the button post is connected to the snap board and the button cap through the recess.

14. The electronic device according to claim 13, wherein the pressing assembly further comprises an elastic gasket fixedly connected to the button post and the snap board, and at least a portion of the elastic gasket is fixedly received in the recess.

15. The electronic device according to claim 13, further comprising:
- a main board, received in the receiving space, wherein the signal triggering element is fixedly disposed on the main board; and
- a display screen, attached to the front cover and disposed between the front cover and the side frame.

16. The electronic device according to claim 13, wherein two ends of the snap board are configured with two hooks;
- a distance exists between each of the two hooks and the side of the button cap facing the signal triggering element;
- two limiting members are opposite to each other and disposed on the inner wall of the through hole, and each of the two limiting members is disposed between each of the two hooks and the side of the button cap facing the signal triggering element along the distance;
- the two hooks are slidable in the through hole; and
- the two hooks are engaged with the two limiting members in the first state, and separated from the two limiting members in the second state.

17. The electronic device according to claim 16, wherein the button cap defines two rivet holes at the two ends of the button cap along a length direction of the button cap;
- the two rivet holes are defined by the side of the button cap facing the signal triggering element being recessed inwardly;
- the pressing assembly further comprises two rivets extending through the snap board and received into the two rivet holes respectively; and
- outer walls of the two rivets are engaged with inner walls of the two rivet holes with an interference fit.

18. A wearable device, comprising: a front cover and a back cover, disposed spaced apart from each other and opposite to each other;
- a side frame, connected between the front cover and the back cover to define a receiving space, wherein the side frame further defines a through hole communicating to the receiving space and an external environment of the wearable device;
- a wearable component, detachably connected to the side frame; and
- a pressing assembly engaged with the side frame and at least partially received in the receiving space;

wherein the pressing assembly comprises:
- a signal triggering element, fixedly received in the receiving space;
- a limiting member, disposed on an inner wall of the through hole and protruding towards the through hole;
- a button post, received in the through hole, wherein an end of the button post is disposed adjacent to but spaced apart from the signal triggering element in a first state, and the end of the button post is in contact with the signal triggering element in a second state;
- a button cap, at least partially received in the through hole and connected to the other end of the button post; and
- a snap board, fastened to a side of the button cap facing the signal triggering element and configured with a hook engaged with the limiting member in the first state, wherein
  - the button cap defines a fastening groove, the fastening groove is defined by a side of the button cap facing the button post being recessed inwardly;
  - a portion of an outer face of the snap board facing the button cap is a protrusion, the protrusion is fixedly received in the fastening groove;
  - an inner face of the snap board facing the button post is recessed inwardly at a position corresponding to the protrusion to define a recess corresponding to the protrusion; and
  - an end of the button post is connected to the snap board and the button cap through the recess.

* * * * *